L. SPANGLER.
COMBINATION LEVEL AND INCLINOMETER.
APPLICATION FILED APR. 12, 1917.
1,261,862.
Patented Apr. 9, 1918.
2 SHEETS—SHEET 1.
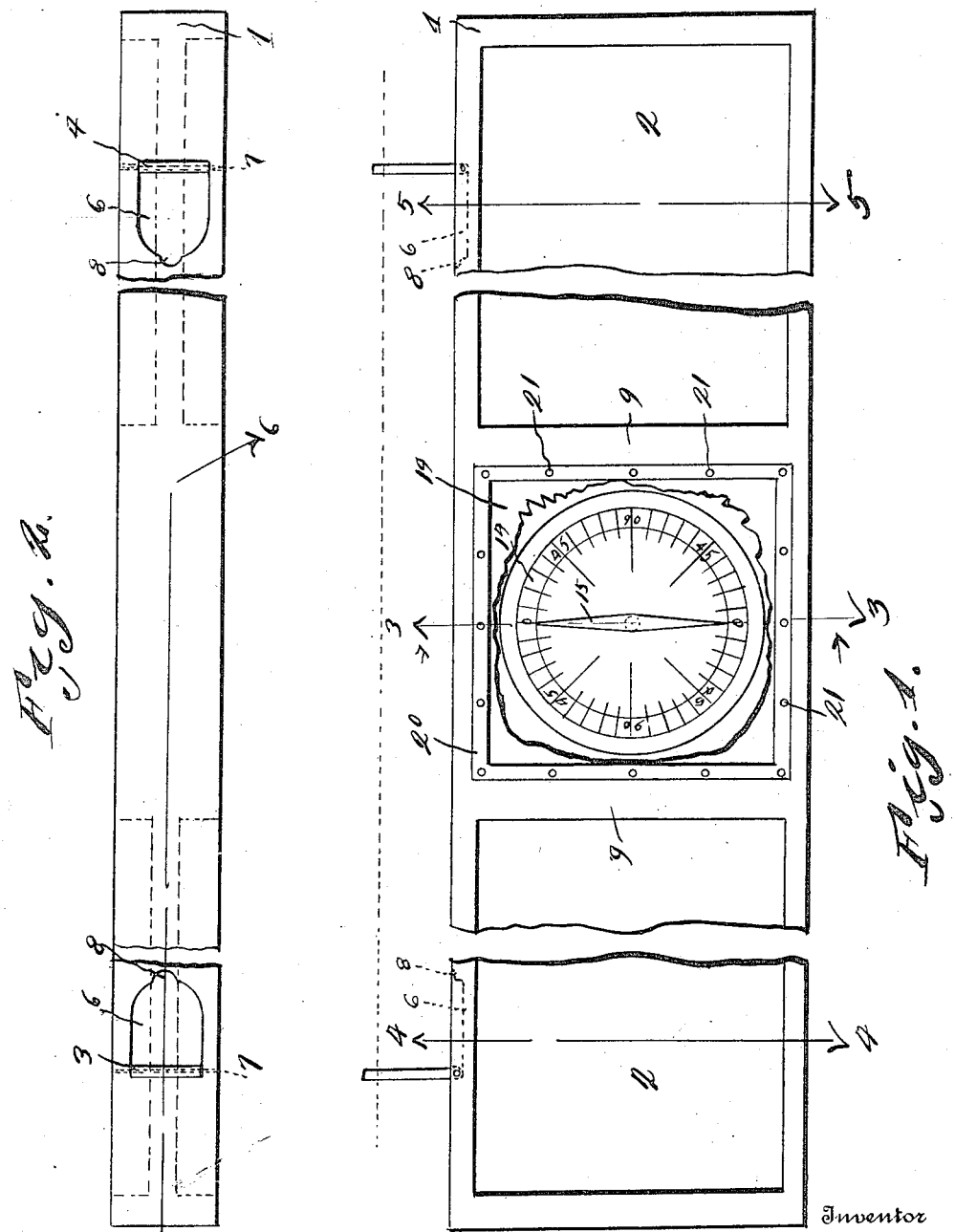
Witnesses
Inventor
L. Spangler
By
Attorneys L. SPANGLER.
COMBINATION LEVEL AND INCLINOMETER.
APPLICATION FILED APR. 12, 1917.

1,261,862.

Patented Apr. 9, 1918.
2 SHEETS—SHEET 2.

Witnesses

Inventor
L. Spangler
By
Attorneys

UNITED STATES PATENT OFFICE.

LLOYD SPANGLER, OF CERRO GORDO, ILLINOIS.

COMBINATION LEVEL AND INCLINOMETER.

1,261,862.  Specification of Letters Patent.  Patented Apr. 9, 1918.

Application filed April 12, 1917. Serial No. 161,507.

*To all whom it may concern:*

Be it known that I, LLOYD SPANGLER, a citizen of the United States, residing at Cerro Gordo, in the county of Piatt, State of Illinois, have invented a new and useful Combination Level and Inclinometer; and I do hereby declare the following to be a full, clear, and exact description of the invention, such as will enable others skilled in the art to which it appertains to make and use the same.

This invention relates to levels, being a device that combines with the leveling function the function of an inclinometer.

Its principal object is to provide a level having a pointer that shows directly when the instrument is sitting level, it being unnecessary to estimate the level position, as is required in the common spirit level where a bubble's position with reference to a specified mark determines the level's position.

A second object is to provide a level with sights hinged to the body, which turn down into depressions formed in the body.

A third object is to provide a level having sights which enable it to be used for finding the angle of inclination of any elevation or grade.

Should the drawings and specification fail to agree by having the one treat of some structure that is not set forth in the other, this want of agreement shall not operate to void the claim to such structure, unless the structure is old and admitted so to be.

The invention is illustrated by a specific structure to which, however, it is not to be restricted. The right is claimed to vary the details of construction within the limits prescribed by the appended claim.

A uniform system of designating the several parts obtains throughout the several figures of the drawings, wherein:

Figure 1 is a side elevation of the invention.

Fig. 2 is a top plan view.

Figure 5:
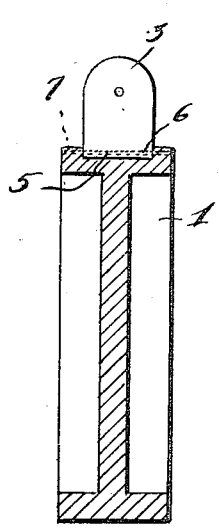
Fig. 5 is a section on the line 5—5 of Fig. 1.
Figure 3:
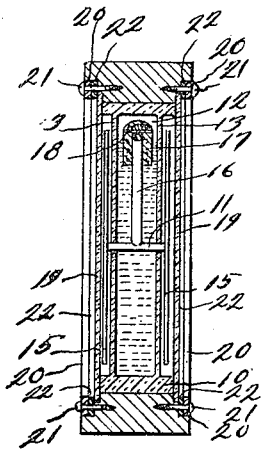
Fig. 3 is a section on the line 3—3 of Fig. 1.
Figure 4:
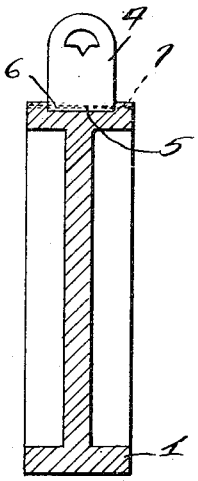
Fig. 4 is a section on the line 4—4 of Fig. 1.
Figure 6:
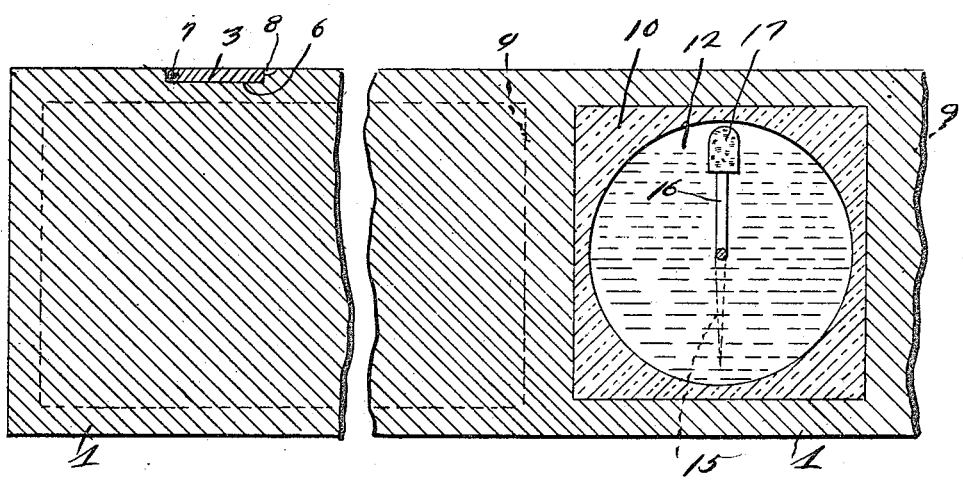
Fig. 6 is a section on the line 6—6 of Fig. 2.

In the drawings 1 represents the stock having the webs 2. On one of the longitudinal edges of the stock the sights 3 and 4 are pivoted, and each sight has a hinge end 5, integral therewith. Depressions 6 are formed in the stock of the same outline as the sights and pins 7 pass transversely through the stock and through the ends 5 of the sights, thus pivotally connecting the sights with the stock, so that they may be turned down into the depression 6. The depressions 6 are dished out at one end, as at 8 to provide means for inserting the finger nail so as to raise the sights.

At the center of the stock the ribbed members 9 together with the adjacent edges of the stock surround a recessed portion wherein the needle and its attendant parts are contained.

A centrally disposed member 10 (of glass or other suitable material) has a staff 11 pivoted between its opposite faces. The member 10 has a square perimeter but has a hollow cylindrical interior 12. Cylindrical depressions are formed on the outer faces of the walls 13 and in each of these depressions a dial 14 is made. The staff 11 is pivoted in the walls 13 and carries on either end a pointer 15 which pointers are adapted to swing over the dials 14. Emanating centrally from the staff 11 is a second staff 16 to which a cork 17 is attached and secured in place by a pin 18. The hollow interior 12 is designed to contain a liquid (preferably a mixture of alcohol and ether). Suitable glass disks 19 abut the member 10 on both sides of the stock 1 and these glass disks are secured to the stock by the flanges 20 and the screws 21, suitable liquid tight gaskets 22 interposing between the flanges and the glass disks. These gaskets are an extra precaution against the evaporation and leakage of the liquid contained in 12, in case the pivotal bearings of the staff 11 are not sufficient insurance against this leakage and evaporation.

The cork 17 which is connected with the pointers by means of its staff 16 and the staff 11 which carries the pointers will always float on top of the liquid contained in 12. Therefore, no matter what the position of the stock, the cork with its staff 16 and the pointers 15 will always be vertical. When the instrument is used to test a piece that is not level, the cipher on the dial would be inclined out of the pependicular and, the pointer being perpendicular, the number of degrees out of level can then be read direct from the dial.

In using the device to determine the inclination of a grade or elevation, the sights 3 and 4 are raised to their vertical position and sight 4 is alined with sight 3 and the top of the elevation. The angle of elevation can then be read from the dial, as the pointer has remained in a vertical position and the stock and the dial raised to the angle of the elevation.

What is claimed is:

In a combined level and inclinometer, a stock having a transverse opening, said opening having both ends double rabbeted annularly, a circular hollow spirit glass fitting said opening, the opposite ends of said glass having annular flanges, a rocking shaft mounted in bearings in the opposite disk walls of the spirit glass, a radiating arm on said shaft and provided with a float on its extremity, to float in the liquid in the spirit glass, glass disks fitting the innermost rabbets of the opposite ends of the opening and engaging the edges of the opposite ends of the spirit glass, thereby forming compartments between the glass disks and the spirit glass, pointers on said shaft and operating in said compartments, and means in the outermost rabbets and overlying the edge portions of the glass disks to hold them in place.

In testimony whereof I have signed my name to this specification in the presence of two subscribing witnesses.

LLOYD SPANGLER.

Witnesses:
 Ed. H. Vulgamott,
 Chas. E. Vulgamott.

Copies of this patent may be obtained for five cents each, by addressing the " Commissioner of Patents, Washington, D. C."